United States Patent
Lewis (10) Patent No.: US 12,485,464 B2
(45) Date of Patent: Dec. 2, 2025

(54) SHALLOW WELL AND CONDUIT/COLLECTOR GRID

(71) Applicant: Watershed Geosynthetics, LLC, Alpharetta, GA (US)

(72) Inventor: Delaney Lewis, Downsville, LA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 184 days.

(21) Appl. No.: 18/222,055

(22) Filed: Jul. 14, 2023

(65) Prior Publication Data

US 2024/0017309 A1   Jan. 18, 2024

Related U.S. Application Data

(60) Provisional application No. 63/389,235, filed on Jul. 14, 2022.

(51) Int. Cl.
 *B09B 5/00* (2006.01)
 *B09B 1/00* (2006.01)

(52) U.S. Cl.
 CPC .................................. *B09B 1/006* (2013.01)

(58) Field of Classification Search
 CPC .............................. B09B 1/004; B09B 1/006
 See application file for complete search history.

(56) References Cited

U.S. PATENT DOCUMENTS

| | | |
|---|---|---|
| 994,155 A | 6/1911 | Harris |
| 3,563,038 A | 2/1971 | Healy et al. |
| 3,593,478 A | 7/1971 | Mason |
| 3,941,556 A | 3/1976 | Pallagi |
| 4,057,500 A | 11/1977 | Wager |
| 4,317,452 A | 3/1982 | Russo et al. |
| 4,442,901 A | 4/1984 | Zison |
| 4,483,641 A | 11/1984 | Stoll |
| 4,487,054 A | 12/1984 | Zison |
| 4,518,399 A | 5/1985 | Croskell et al. |
| 4,596,491 A | 6/1986 | Dietzler |

(Continued)

FOREIGN PATENT DOCUMENTS

| | | |
|---|---|---|
| CA | 2154239 | 1/1997 |
| DE | 19703826 A1 | 8/1998 |

(Continued)

OTHER PUBLICATIONS

International Search Report and The Written Opinion of the International Searching Authority; for International Application No. PCT/US14/26065; Aug. 11, 2014; 12 pages; International Searching Authority/United States, Alexandria, US.

(Continued)

*Primary Examiner* — Benjamin F Fiorello
(74) *Attorney, Agent, or Firm* — GARDNER THORPE (57) ABSTRACT

A shallow gas well for use at landfills having a gas-producing waste pile includes a lower geocomposite positioned over the gas-producing waste pile and a protective layer of soil positioned over the lower geocomposite. An upper geocomposite is positioned over the protective layer of soil such that the protective layer of soil is positioned between the lower and upper geocomposites. An impermeable geomembrane is positioned over the upper geocomposite and a shallow gas well collector is positioned within the protective layer of soil.

15 Claims, 13 Drawing Sheets

(56) References Cited

U.S. PATENT DOCUMENTS

| | | | |
|---|---|---|---|
| 4,670,148 A * | 6/1987 | Schneider | B09B 1/00 |
| | | | 210/603 |
| 5,221,159 A | 6/1993 | Billings et al. | |
| 5,259,697 A * | 11/1993 | Allen | C04B 7/246 |
| | | | 106/707 |
| 5,588,490 A | 12/1996 | Suthersan et al. | |
| 5,857,807 A * | 1/1999 | Longo, Sr. | E21B 43/305 |
| | | | 405/129.95 |
| 5,893,680 A | 4/1999 | Lowry et al. | |
| 6,280,117 B1 | 8/2001 | Obermeyer et al. | |
| 6,305,473 B1 | 10/2001 | Peramaki | |
| 6,742,962 B2 | 6/2004 | Hater et al. | |
| 6,749,368 B2 * | 6/2004 | Ankeny | B09C 1/005 |
| | | | 405/129.95 |
| 6,910,829 B2 | 6/2005 | Nickelson et al. | |
| 7,153,061 B2 | 12/2006 | Nickelson et al. | |
| 7,198,433 B2 | 4/2007 | Augenstein et al. | |
| 7,309,431 B2 | 12/2007 | Degarie | |
| 7,448,828 B2 | 11/2008 | Augenstein et al. | |
| 7,722,289 B2 | 5/2010 | Leone | |
| 7,972,082 B2 * | 7/2011 | Augenstein | B09B 1/004 |
| | | | 405/129.95 |
| 8,002,498 B2 | 8/2011 | Leone et al. | |
| 8,047,276 B2 | 11/2011 | Stamoulis | |
| 8,168,121 B2 | 5/2012 | Elkins | |
| 8,192,111 B2 | 6/2012 | Zimmel | |
| 8,313,921 B2 * | 11/2012 | Kraemer | C12M 21/04 |
| | | | 405/129.95 |
| 8,398,335 B2 | 3/2013 | Stamoulis | |
| 8,777,515 B1 | 7/2014 | Donlin | |
| 9,375,766 B2 | 6/2016 | Ayers et al. | |
| 10,279,382 B2 * | 5/2019 | Ko | B09B 1/004 |
| 10,697,145 B2 | 6/2020 | Lewis | |
| 11,047,101 B2 | 6/2021 | Lewis | |
| 11,053,651 B2 * | 7/2021 | Lewis | B09B 1/00 |
| 11,123,776 B2 * | 9/2021 | Filshill | B09B 3/00 |
| 11,633,767 B2 * | 4/2023 | Shana'a | B09B 1/004 |
| | | | 405/129.2 |
| 2003/0008381 A1 | 1/2003 | Augenstein | |
| 2003/0111122 A1 | 6/2003 | Horton | |
| 2004/0062610 A1 | 4/2004 | Hater et al. | |
| 2004/0103866 A1 | 6/2004 | Benjey | |
| 2004/0112607 A1 | 6/2004 | Beckhardt | |
| 2005/0082830 A1 | 4/2005 | Voelker | |
| 2005/0201831 A1 * | 9/2005 | Lee | E02D 31/00 |
| | | | 405/129.95 |
| 2005/0236042 A1 | 10/2005 | Hansen et al. | |
| 2005/0269253 A1 | 12/2005 | Potts | |
| 2006/0034664 A1 * | 2/2006 | Augenstein | B09B 1/00 |
| | | | 405/129.95 |
| 2008/0017558 A1 | 1/2008 | Pollock et al. | |
| 2008/0080934 A1 | 4/2008 | Duffney | |
| 2009/0136298 A1 | 5/2009 | Augestein et al. | |
| 2011/0045580 A1 * | 2/2011 | Hater | B09B 1/006 |
| | | | 435/290.4 |
| 2011/0302876 A1 | 12/2011 | Giffin | |
| 2014/0261788 A1 * | 9/2014 | Lewis | F16K 17/12 |
| | | | 137/505 |
| 2020/0122208 A1 | 4/2020 | Lewis | |
| 2020/0173129 A1 | 6/2020 | Lewis | |

FOREIGN PATENT DOCUMENTS

| | | |
|---|---|---|
| EP | 0075993 | 4/1983 |
| EP | 2361698 A1 | 8/2011 |
| GB | 589815 | 7/1947 |
| JP | 11216440 A | 8/1999 |
| JP | 2003340392 A | 12/2003 |
| WO | 2007103153 A3 | 9/2007 |
| WO | 2008061294 A1 | 5/2008 |
| WO | 2011148139 A3 | 11/2012 |
| WO | 2014164609 A1 | 10/2014 |
| WO | 2021158920 | 8/2021 |

OTHER PUBLICATIONS

Barometrically Enhanced Remediation Technology (BERT); Innovative Technology Summary Report, Mar. 2000, 28 pages, Prepared for U.S. Department of Energy, Office of Environmental Management, Office of Science and Technology, US.

International Search Report and The Written Opinion of the International Searching Authority; for International Application No. PCT/US14/22991; Jul. 3, 2014; 8 pages; International Searching Authority/United States, Alexandria, US.

International Search Report and Written Opinion of the International Searching Authority for PCT Application No. PCT/US2018/061094, dated Feb. 20, 2019, 14 pages.

International Preliminary Report on Patentability for PCT Application No. PCT/US2018/061094, dated May 20, 2020, 6 pages.

International Search Report and Written Opinion of the International Searching Authority for PCT Application No. PCT/US2021/016825, dated Mar. 2, 2021, 10 pages.

* cited by examiner

SHALLOW WELL AND CONDUIT/COLLECTOR GRID

BACKGROUND

In many instances, a fluid needs to be moved over a large distance or collected over a large area. For example, as waste material decomposes in a landfill, it gives off various gases. In the past, it has been known to use pumps, piping, and wellheads to extract the gases from the landfill and collect the same. Such wellheads are often spaced about one per acre in a grid pattern. Such systems of collecting the gases can be shut down by many factors, including power failures. To prevent the undesirable build-up of such gases in the event of non-operation of the extraction system, it has often been known to employ a grid pattern of vents spaced between the extraction wellheads, often at the same one per acre density.

As described in published U.S. Patent Application Number 20060034664, conventional gas extraction wells at landfills often involve deep wells attached to a network of pipes and a gas pump (blower) that applies vacuum (negative pressure) to extract the gas from the stored waste as the waste decomposes.

Figure 1:
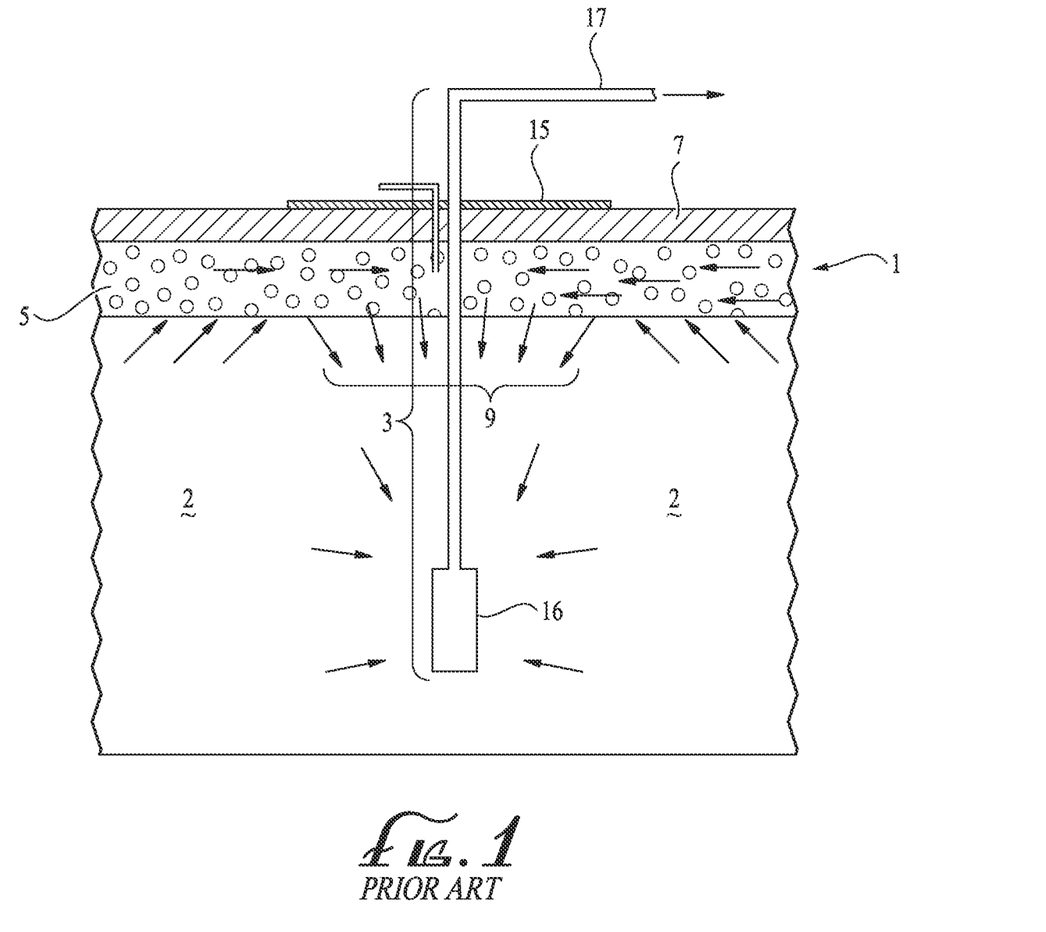
FIG. 1 is a schematic illustration of a first prior art wellhead for extracting sub-surface gas from a waste landfill.

A prior art deep well arrangement according to the above published patent application is shown in FIG. 1. Landfill 1 containing waste 2 generates biogas (biogas flows shown by the arrows). Biogas is collected and extracted through a well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well from which gas can be extracted. The well often includes a section of pipe having slots or other gas-flow apertures cut in it, referred to as a "well screen". Often, the well screen is also surrounded with gravel.

The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well.

The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

The deep well design of FIG. 1 is designed to pull gas away from the surface to protect the membrane cover from being impacted with gas buildup that can create ballooning. Typically, the deep well has a diminishing radius (zone) of influence as a result of pressure loss through the length of the well collector pipes. The deep well vacuum pressure pulls both gas and leachate into the well. Leachate pumps are often required, resulting in more membrane penetrations. The membrane cover helps alleviate air intrusion issues—however, multiple penetrations typically are required at each collection point. Membrane penetrations around wellheads are very susceptible to rips and tears the result in either gas leaks or air intrusion into the waste. Another drawback to the deep well is that the deep well must be continually monitored and adjusted. Deep wells normally utilize an adjustable valve at each collection point to control pressures within the well to adjust the radius of influence, but have limited maximum radius of influence from the control valve.

Figure 2:
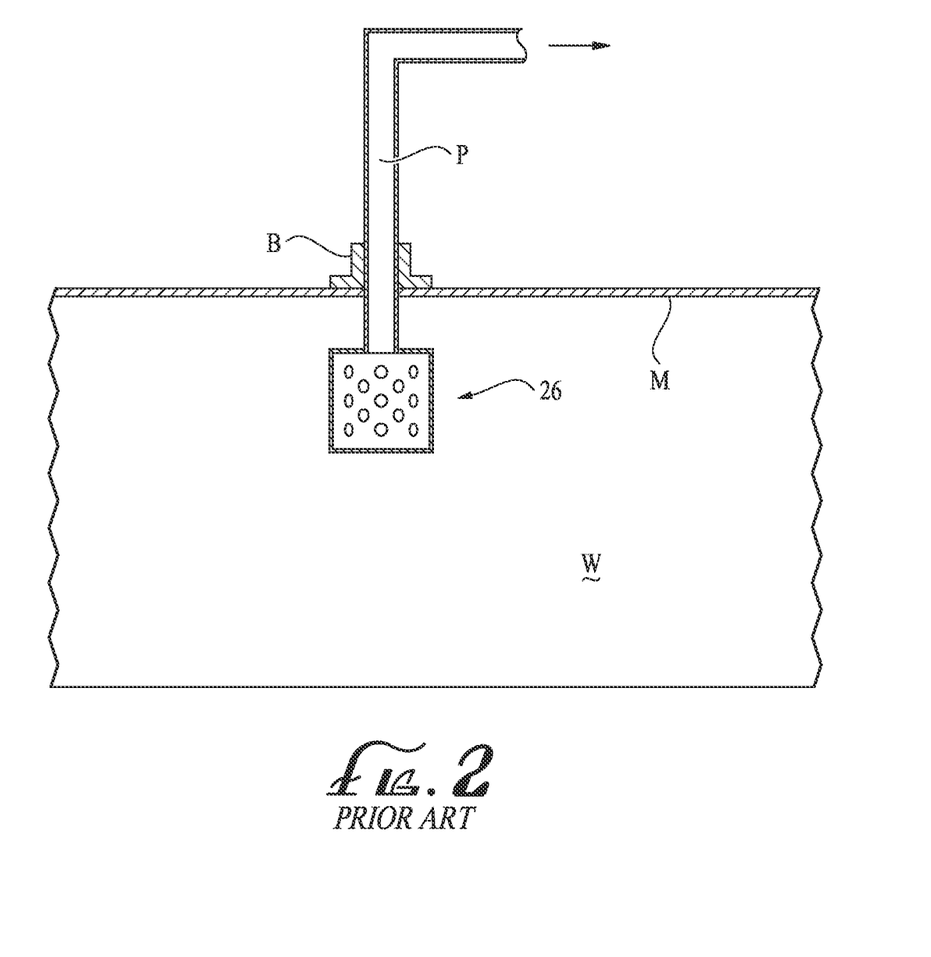
FIG. 2 is a schematic illustration of a second prior art wellhead for extracting sub-surface gas from a waste landfill.

FIG. 2 shows another prior art arrangement, this time showing a more shallow wellhead 26 used to withdraw near-surface or sub-surface gas from beneath a membrane M capping a waste W. The wellhead 26 is attached to an above-ground conduit by way of a vertical pipe.

Figure 3:
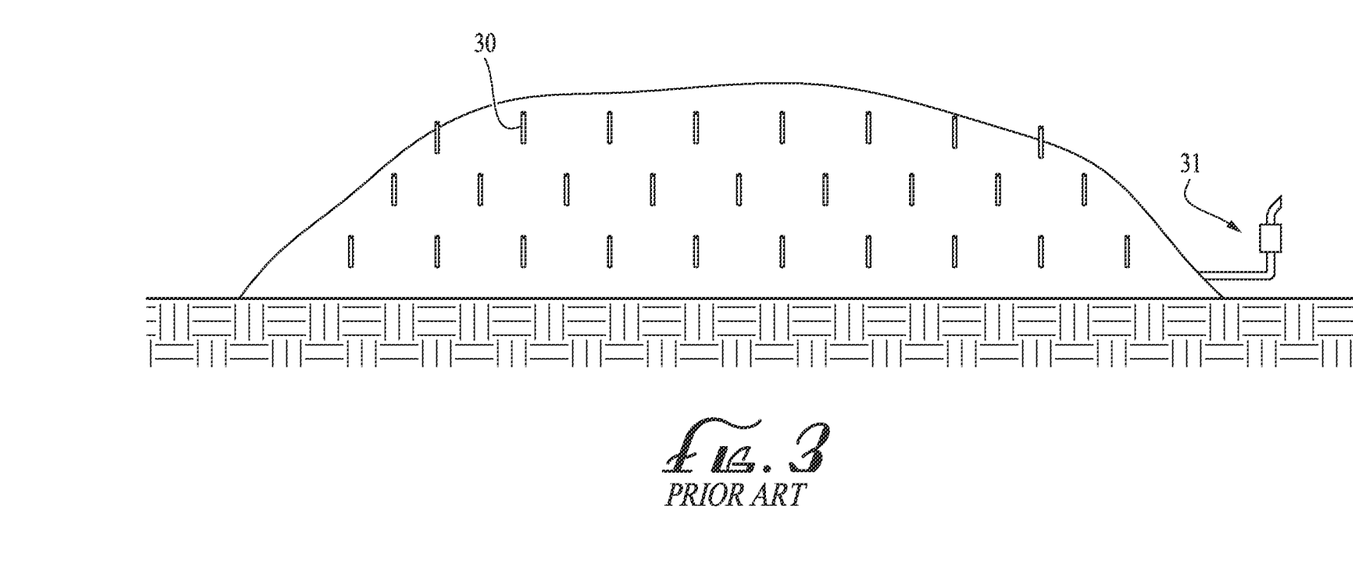
FIG. 3 is a schematic illustration of a prior art waste landfill with multiple wellheads for extracting sub-surface gas from a waste landfill.

FIG. 3 shows another prior art arrangement, this time depicting a landfill with multiple wellheads 30 used to withdraw near-surface or sub-surface gas from beneath the surface. The wellheads 30 are attached to an above-ground vent 31.

Figure 4:
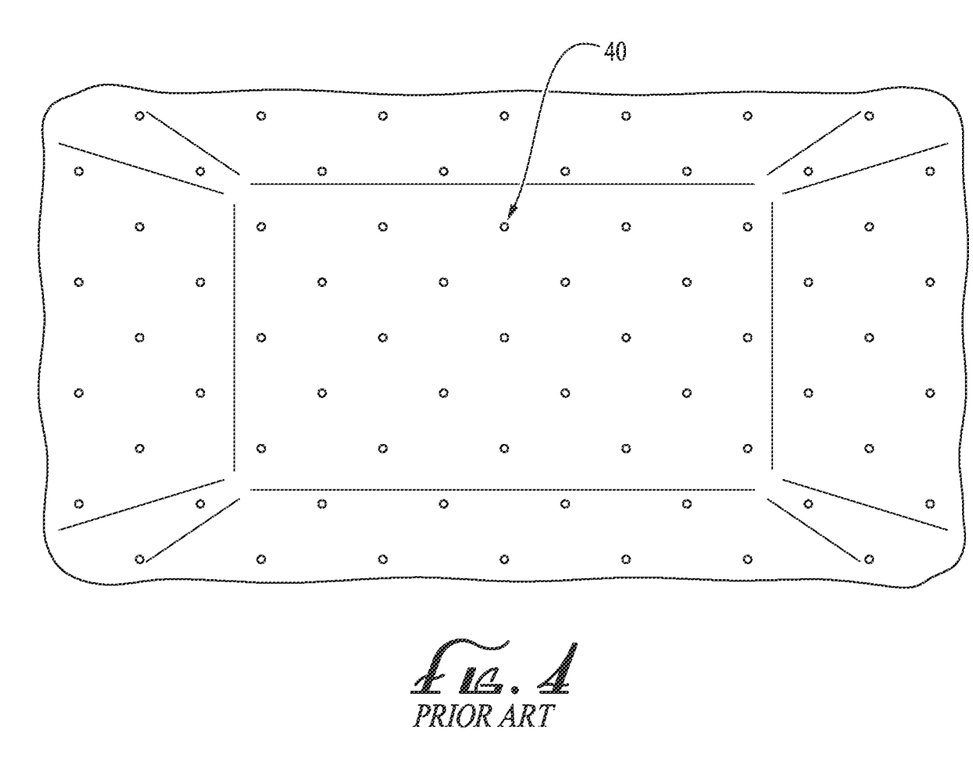
FIG. 4 is a schematic illustration of a prior art waste landfill with multiple wellheads for extracting sub-surface gas from a waste landfill.

FIG. 4 shows another prior art arrangement similar to that in FIG. 2, this time showing a field of wellheads 40 spaced to extract the gases from a landfill and collect the same. Such wellheads are often spaced about one per acre.

SUMMARY OF THE INVENTION

In an example form, the present invention relates to a shallow gas well, such as for use at landfills and the like of the type having a gas-producing waste pile. The shallow gas well includes a lower geocomposite positioned over the gas-producing waste pile and a protective layer of soil positioned over the lower geocomposite. An upper geocomposite is positioned over the protective layer of soil such that the protective layer of soil is positioned between the lower and upper geocomposites. An impermeable geomembrane is positioned over the upper geocomposite and a shallow gas well collector is positioned within the protective layer of soil. Preferably, the shallow gas well includes a non-perforated outer pipe extending generally from the lower geocomposite toward the upper geocomposite. A perforated inner pipe is positioned within and extends within the non-perforated outer pipe and together with the non-perforated outer pipe defines a space between the two pipes. A quantity of gravel-like material is positioned within the space between the perforated inner pipe and the non-perforated outer pipe. A transport conduit extends beneath the geomembrane, and without extending through the geomembrane, for transporting gas produced by the waste pile and collected through the gravel-like material and into and through the perforated inner pipe of the shallow gas well collector.

Optionally, a perforated gas collector is positioned within the perforated inner pipe and is connected in fluid communication with the transport conduit. Also optionally, the perforated gas collector is capped at a lower end thereof with a cap and the cap includes a drain to allow condensate to drain out of the perforated gas collector.

Optionally, the gravel-like material can be gravel. Also optionally, the gravel-like material comprises shredded rubber or other materials that allow gas to flow therethrough.

Optionally, the transport conduit can be in the form of round pipe. Alternatively, the transport conduit can be low-profile, short, flat conduit which is much wider than it is tall. Also, a combination of round pipe and flat conduit can be employed.

In another example form, the present invention relates to a collection grid of shallow gas wells for use at landfills and the like of the type having a gas-producing waste pile. The shallow gas wells are connected to one another in fluid communication and the collected gas can be drawn away by one or more pumps. The shallow gas wells include a lower geocomposite positioned over the gas-producing waste pile and a protective layer of soil positioned over the lower geocomposite. An upper geocomposite is positioned over the protective layer of soil such that the protective layer of soil is positioned between the lower and upper geocomposites. An impermeable geomembrane is positioned over the upper geocomposite and a shallow gas well collector is positioned within the protective layer of soil. The shallow gas well collector includes a non-perforated outer pipe extending generally from the lower geocomposite toward the upper geocomposite and a perforated inner pipe positioned within and extending within the non-perforated outer pipe and together with the non-perforated outer pipe defining a space between the two pipes. A quantity of gravel-like material is positioned within the space between the perforated inner pipe and the non-perforated outer pipe. A transport conduit extends beneath the geomembrane and without extending through the membrane for transporting gas produced by the waste pile and collected through the gravel-like material and into and through the perforated inner pipe of the shallow gas well collector.

Optionally, the shallow gas wells each have a perforated gas collector positioned within the perforated inner pipe and connected in fluid communication with the transport conduit. Preferably, the perforated gas collector is are capped at a lower end of thereof and the cap includes a drain to allow condensate to drain out of the perforated gas collector.

Optionally, the gravel-like material in the shallow gas wells comprises gravel. Alternatively, the gravel-like material in the shallow gas wells can be shredded rubber or other material that allows gas to flow through the material.

Optionally, the transport conduits comprise round pipe. Alternatively, the transport conduits can be low-profile, short, flat conduits which are much wider than tall. Further, a combination of round pipe and flat conduits can be employed.

Preferably, the grid is substantially cruciform in shape and at intersections of various conduits an adapter T or cross is provided. Optionally, the adapter T or cross has an upper opening and is provided with a cover for covering the upper opening.

Preferably, the grid includes at least one trunk conduit and at least two branch conduits. The trunk conduit and the branch conduits each comprise an elongate, non-perforated outer cover. Optionally, the grid further comprises at least four collector conduits which intersect and connect to the branch conduits. The at least four collector conduits each comprise an elongate perforated outer cover.

Preferably, the elongate outer cover comprises a polymer.

Preferably, the collector conduits have an aspect ratio of width to height of more than 10:1. More preferably, the aspect ratio is more than 20:1. Indeed, even an aspect ratio of more than 50:1 can be achieved.

DESCRIPTION OF EXAMPLE EMBODIMENTS

In an example form, the invention relates to a low-profile fluid collection well, such as for use at landfills and the like. In another example form, the present invention relates to a grid of gas collection wells and subsurface fluid conveyance conduit. Examples of these follow.

Shallow Gas Well and Related Components

In one example form, the present invention relates to a sub-surface shallow gas well 50 for collecting and/or conveying sub-surface gas and the like from near the surface of landfills, typically for use with a geomembrane for capping a waste field. The geomembrane is generally impermeable to fluids in order to contain or cap the waste below, and thereby restrict the sub-surface gas from flowing into the atmosphere and to restrict atmospheric air from flowing into the waste below the geomembrane.

Figure 5:
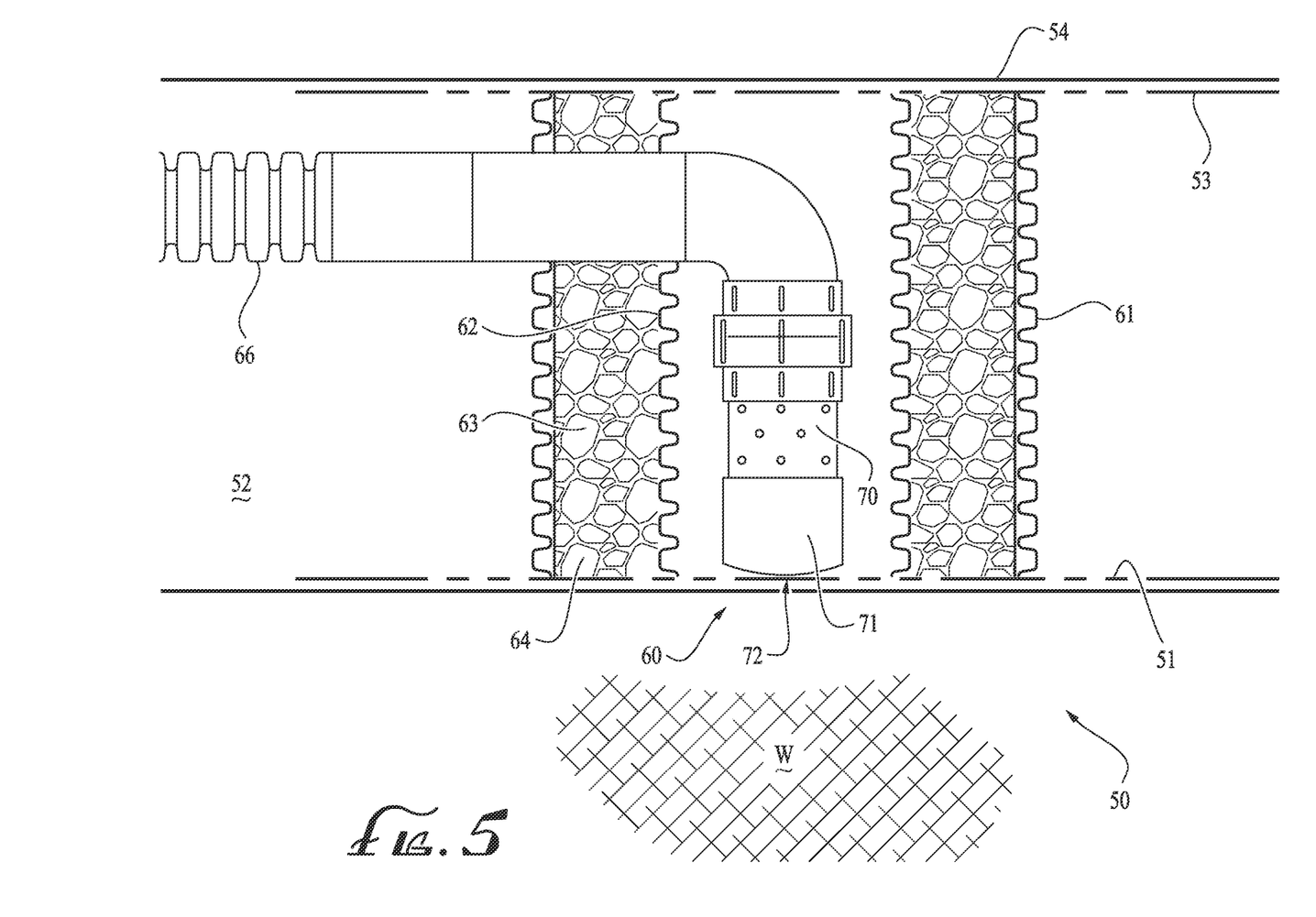
FIG. 5 is a schematic, sectional view of a shallow gas well for extracting and/or conveying sub-surface gas from a waste landfill according to a first preferred example form of the present invention.

FIG. 5 is a schematic, sectional view of the shallow gas well 50 for extracting and/or conveying sub-surface gas from a waste landfill according to a preferred example embodiment of the present invention. The shallow gas well 50 is for use at landfills and the like of the type having a gas-producing waste pile W. The shallow gas well 50 includes a lower geocomposite 51 positioned over the gas-producing waste pile W and a protective layer of soil 52 positioned over the lower geocomposite 51. Preferably, the protective soil layer can be between about 12 and 18 inches deep. An upper geocomposite 53 is positioned over the protective layer of soil 52 such that the protective layer of soil 52 is positioned between the lower and upper geocomposites 51, 53. An impermeable geomembrane 54 is positioned over the upper geocomposite 53 and a shallow gas well collector 60 is positioned within the protective layer of soil 52. Preferably, the shallow gas well 50 includes a non-perforated outer pipe 61 extending generally from the lower geocomposite 51 toward the upper geocomposite 53. As shown, the solid (non-perforated) outer pipe 61 can be corrugated, if desired. Likewise, the outer pipe 61 can be non-corrugated. A corrugated and perforated inner pipe 62 is positioned within and extends within the non-perforated outer pipe 61 and together with the non-perforated outer pipe defines a space 63 between the two pipes. The perforated inner pipe can also be non-corrugated or a mixture of corrugated and non-corrugated. A quantity of gravel-like material 64 is positioned within the space between the perforated inner pipe and the non-perforated outer pipe.

A transport conduit 66 extends beneath the geomembrane 54, and without extending through the geomembrane 54, for transporting gas produced by the waste pile W and collected through the gravel-like material 64 and into and through the perforated inner pipe 62 of the shallow gas well collector 60. The transport conduit 66 can be smooth, corrugated, or part smooth and part corrugate. As shown in this embodiment, the transport conduit 66 can be round pipe. Other shapes are possible, as will be discussed below.

Optionally, a perforated gas collector 70 is positioned within the perforated inner pipe and is connected in fluid communication with the transport conduit 66. Also optionally, the perforated gas collector 70 is capped at a lower end thereof with a cap 71 and the cap includes a drain 72 to allow condensate to drain out of the perforated gas collector 70.

Optionally, the gravel-like material 64 can be gravel. Also optionally, the gravel-like material 64 comprises shredded rubber or other materials that allow gas to flow therethrough.

Optionally, the transport conduit can be in the form of round pipe. Alternatively, the transport conduit can be low-profile, short, flat conduit which is much wider than it is tall. Also, a combination of round pipe and flat conduit can be employed.

Figure 6:
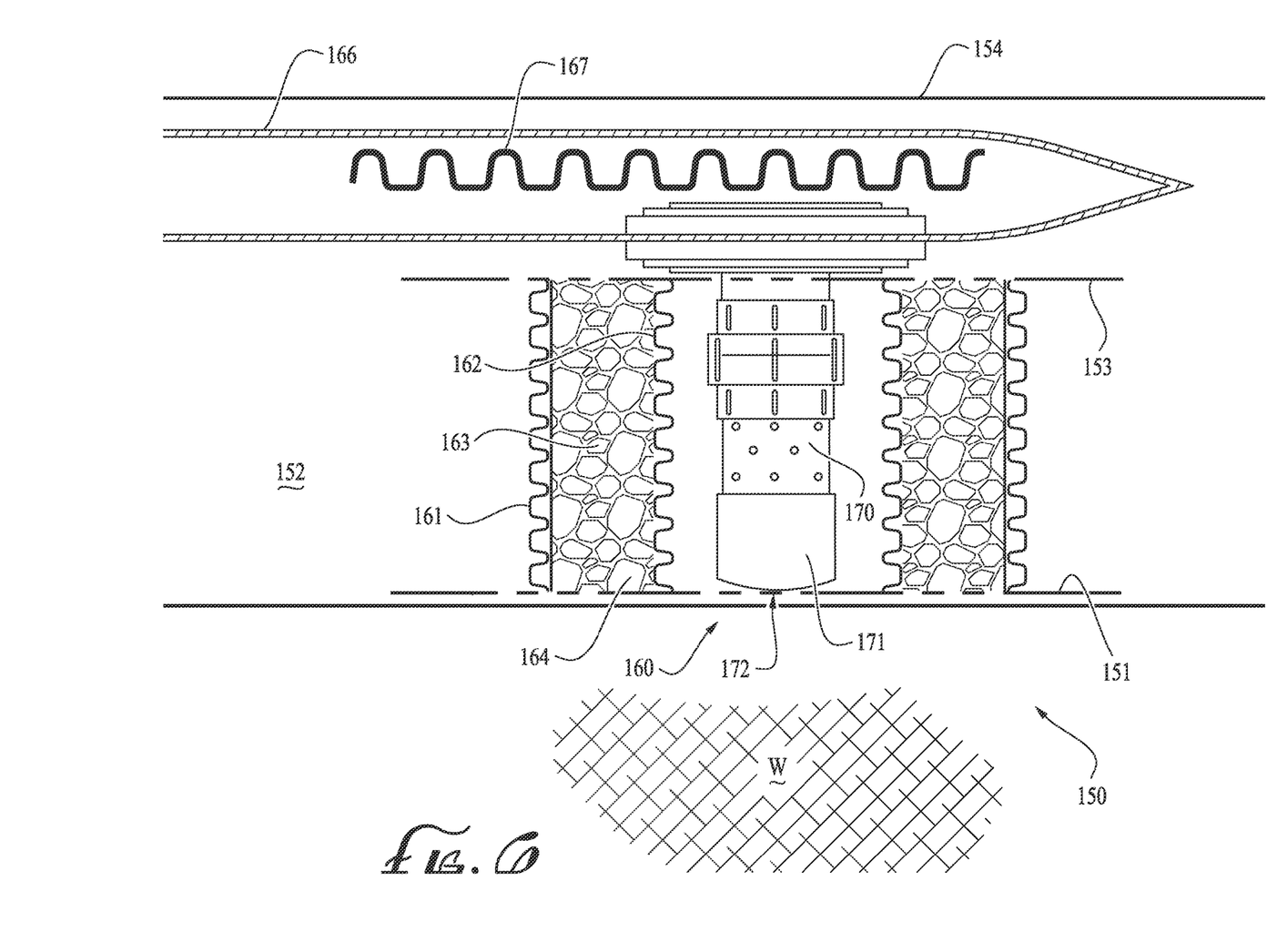
FIG. 6 is a schematic, perspective, partially cut-away view of a shallow gas well for extracting and/or conveying sub-surface gas from a waste landfill according to another preferred example form of the present invention.

FIG. 6 shows another form of a shallow gas well 150 for extracting and/or conveying sub-surface gas from a waste landfill according to another preferred example embodiment of the present invention. The shallow gas well 150 is for use at landfills and the like of the type having a gas-producing waste pile W. The shallow gas well 150 includes a lower geocomposite 151 positioned over the gas-producing waste pile W and a protective layer of soil 152 positioned over the lower geocomposite 151. Preferably, the protective soil layer 152 can be between about 12 and 18 inches deep. An upper geocomposite 153 is positioned over the protective layer of soil 152 such that the protective layer of soil 152 is positioned between the lower and upper geocomposites 151, 153. An impermeable geomembrane 154 is positioned over the upper geocomposite 153 and a shallow gas well collector 160 is positioned within the protective layer of soil 52. Preferably, the shallow gas well 150 includes a non-perforated outer pipe 161 extending generally from the lower geocomposite 151 toward the upper geocomposite 153. As shown, the solid (non-perforated) outer pipe 161 can be corrugated, if desired. Likewise, the outer pipe 161 can be non-corrugated. A corrugated and perforated inner pipe 162 is positioned within and extends within the non-perforated outer pipe 161 and together with the non-perforated outer pipe defines a space 163 between the two pipes. The perforated inner pipe can also be non-corrugated or a mixture of corrugated and non-corrugated. A quantity of gravel-like material 164 is positioned within the space between the perforated inner pipe and the non-perforated outer pipe.

A transport conduit 166 extends beneath the geomembrane 154, and without extending through the geomembrane 154, for transporting gas produced by the waste pile Wand collected through the gravel-like material 164 and into and through the perforated inner pipe 162 of the shallow gas well collector 160. The transport conduit 166 can be smooth, corrugated, or part smooth and part corrugated. As shown in this embodiment, the transport conduit 166 can be a flat, wide, shallow pipe and can have internal ribs 167 or other structure to keep the pipe from collapsing. As shown in this example, the internal ribs 167 can take the form of a "J-drain".

Optionally, a perforated gas collector 170 is positioned within the perforated inner pipe and is connected in fluid communication with the transport conduit 166. Also optionally, the perforated gas collector 170 is capped at a lower end thereof with a cap 171 and the cap includes a drain 172 to allow condensate to drain out of the perforated gas collector 170.

A Shallow Gas Well Collection Grid

As shown in FIG. 7-13 in another example form, the present invention relates to a collection grid 200 of shallow gas wells 250 for use at landfills and the like of the type having a gas-producing waste pile W. The shallow gas wells 250 can be of the general designs described above and shown in FIGS. 5 and 6 and can be connected to one another in fluid communication and the collected gas can be drawn away by one or more pumps. The shallow gas wells include a lower geocomposite 251 positioned over the gas-producing waste pile W and a protective layer of soil 202 positioned over the lower geocomposite 251. An upper geocomposite 253 is positioned over the protective layer of soil 202 such that the protective layer of soil 202 is positioned between the lower and upper geocomposites 251, 253. An impermeable geomembrane 254 is positioned over the upper geocomposite 253 and a large number shallow gas well collectors 260 are positioned within the protective layer of soil 202. As can be seen more clearly in the embodiments shown in FIGS. 5 and 6, the shallow gas well collectors 260 include a non-perforated outer pipe extending generally from the lower geocomposite toward the upper geocomposite and a perforated inner pipe positioned within and extending within the non-perforated outer pipe and together with the non-perforated outer pipe defining a space between the two pipes. A quantity of gravel-like material is positioned within the space between the perforated inner pipe and the non-perforated outer pipe. A transport conduit extends beneath the geomembrane 254 and without extending through the membrane 254 for transporting gas produced by the waste pile W and collected through the gravel-like material and into and through the perforated inner pipe of the shallow gas well collector.

Figure 7:
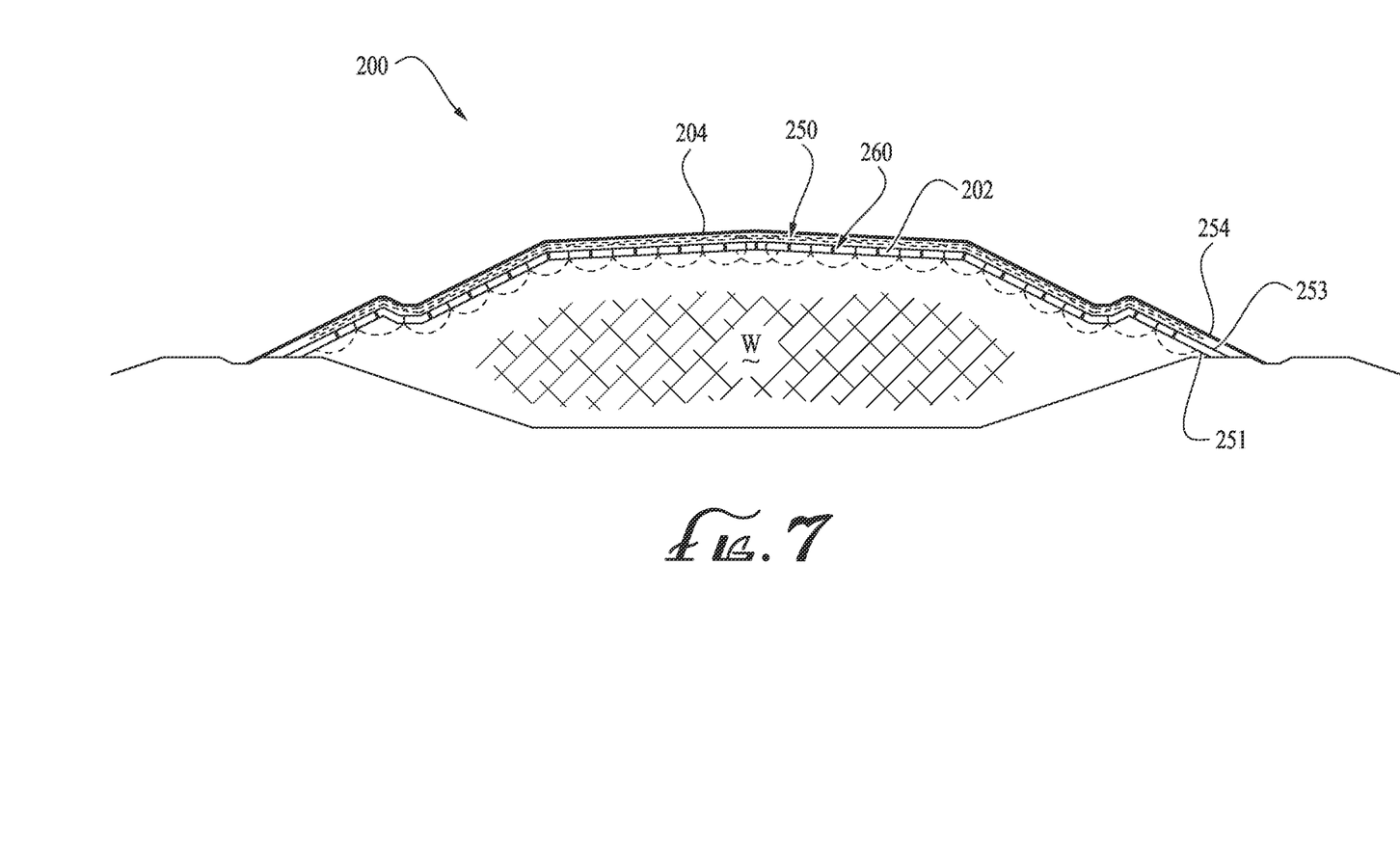
FIG. 7 is a schematic, sectional view of a collection grid of shallow gas wells for extracting and/or conveying sub-surface gas from a waste landfill according to another preferred example form of the present invention.
Figure 8:
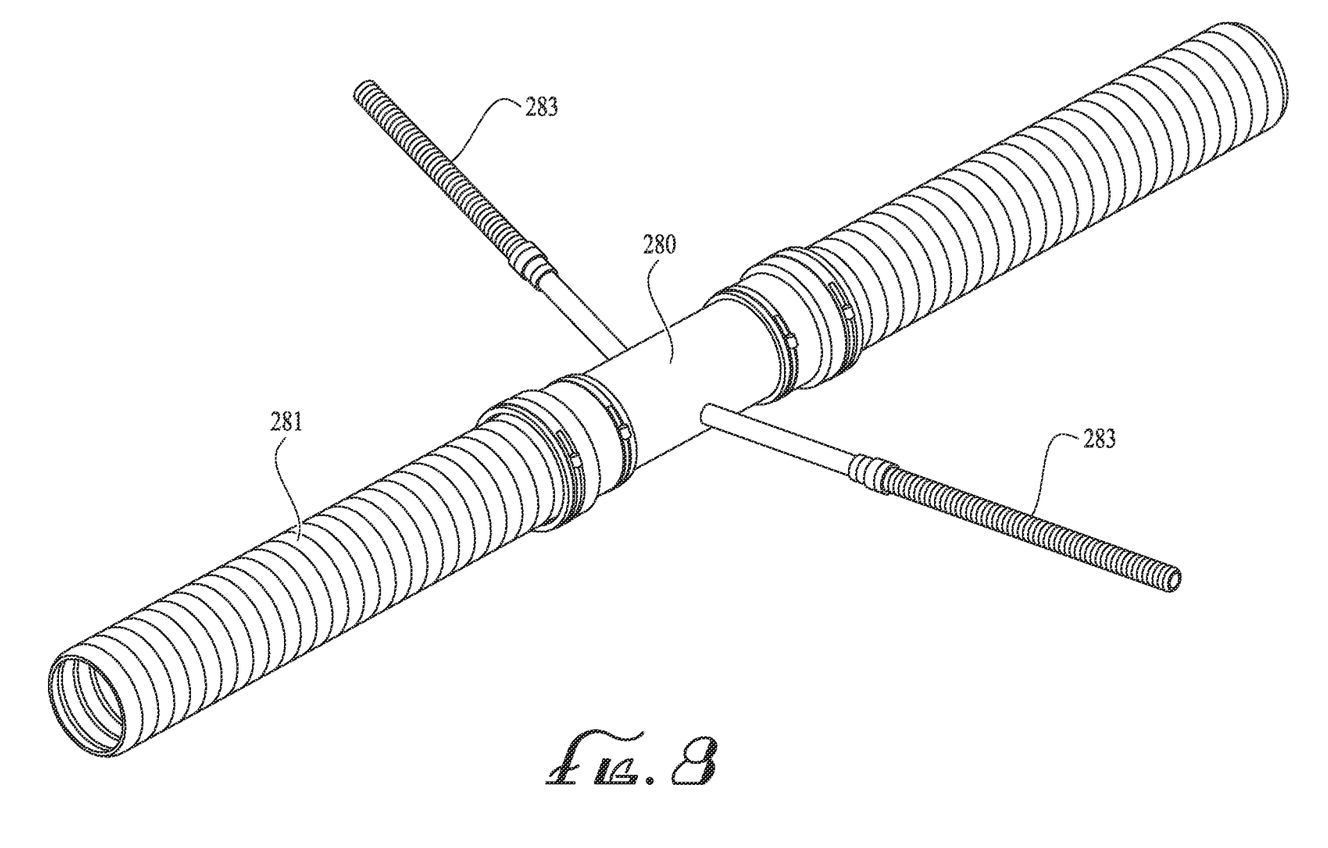
FIG. 8 is a schematic, perspective view of conduit portions of the collection grid of FIG. 7 in an example form of the present invention.
Figure 9:
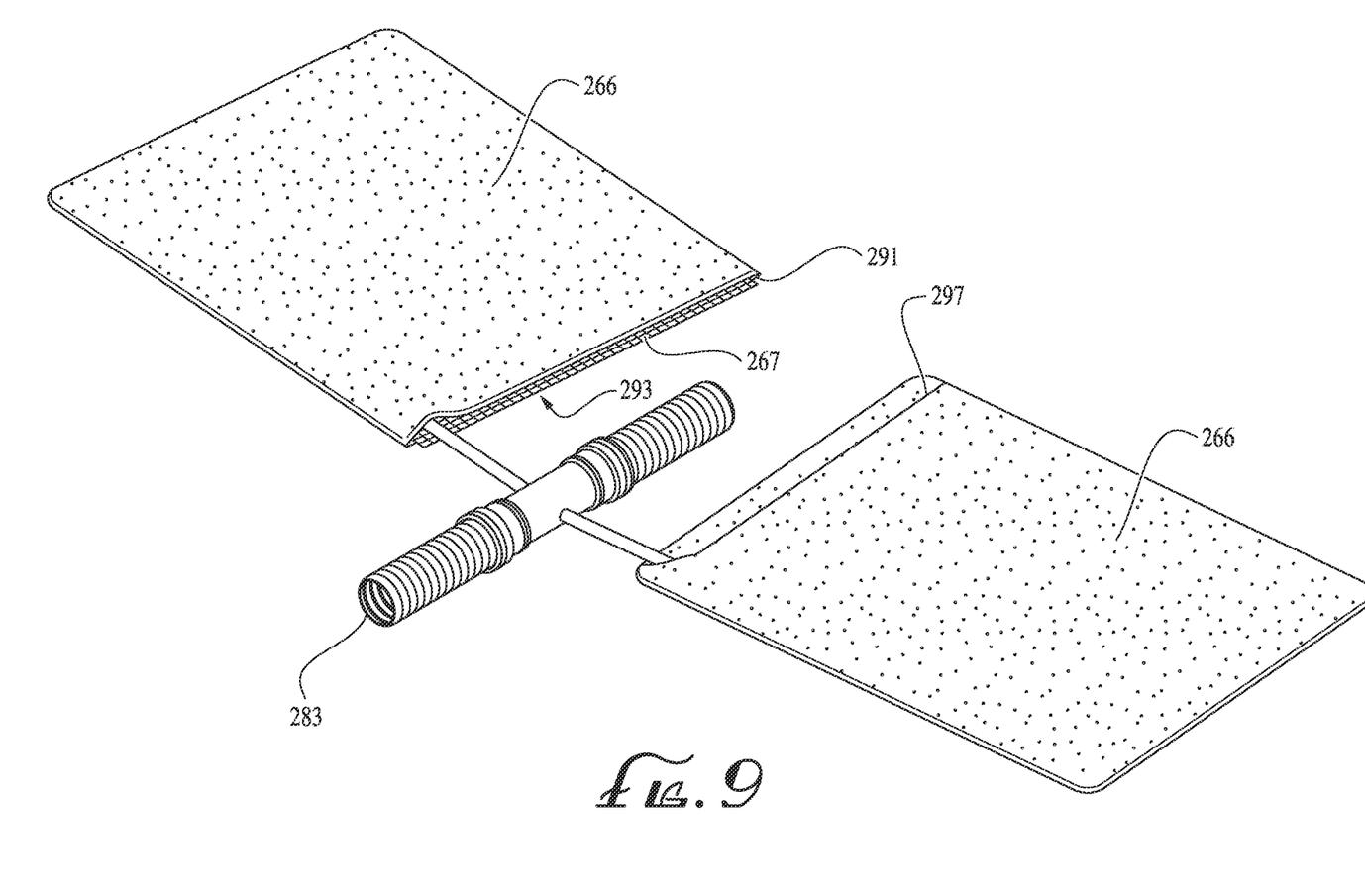
FIG. 9 is a schematic, perspective view of conduit portions of the collection grid of FIG. 7 in an example form of the present invention.
Figure 10:
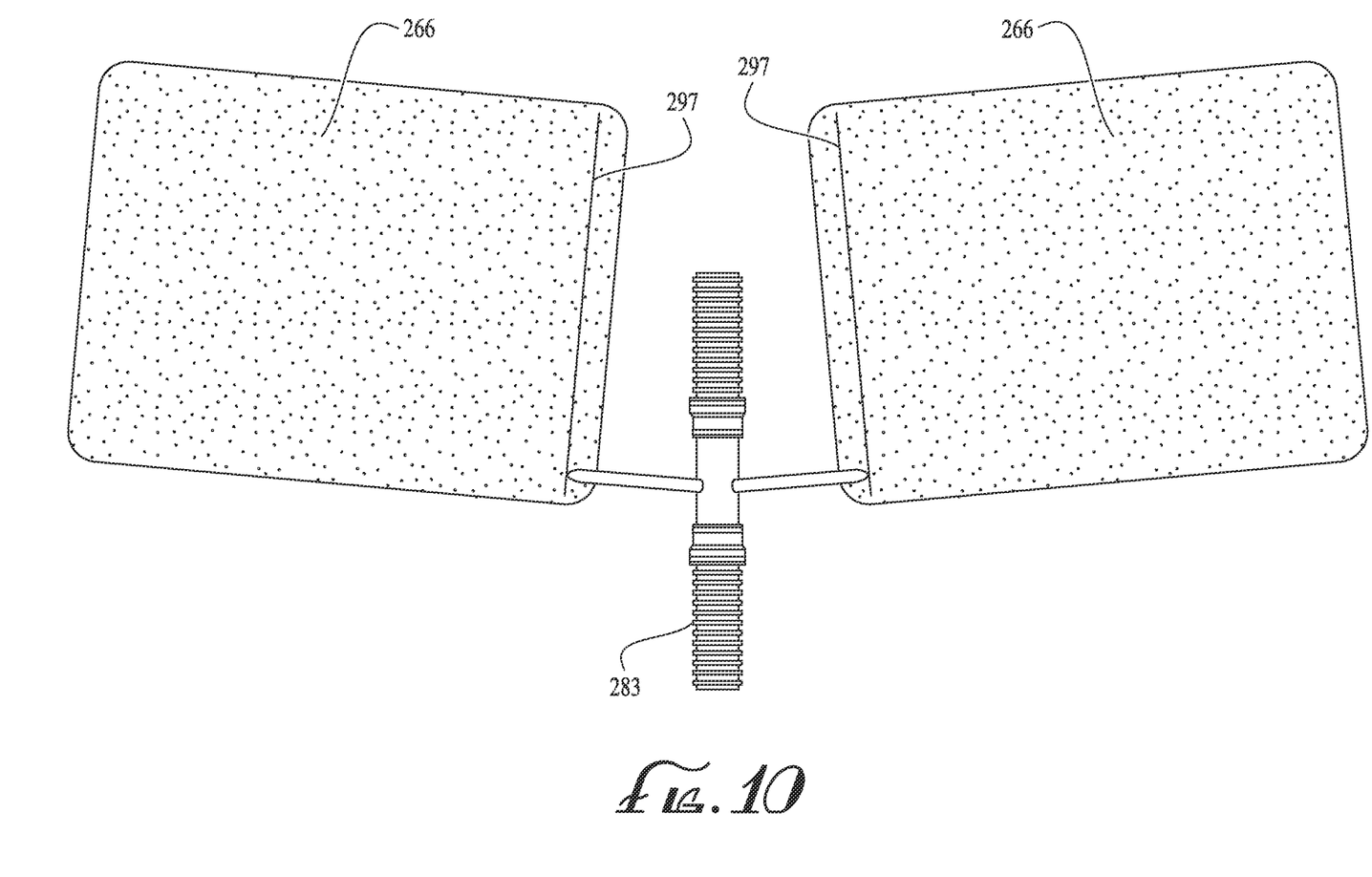
FIG. 10 is a schematic, top view of conduit portions of the collection grid of FIG. 7 in an example form of the present invention.
Figure 11:
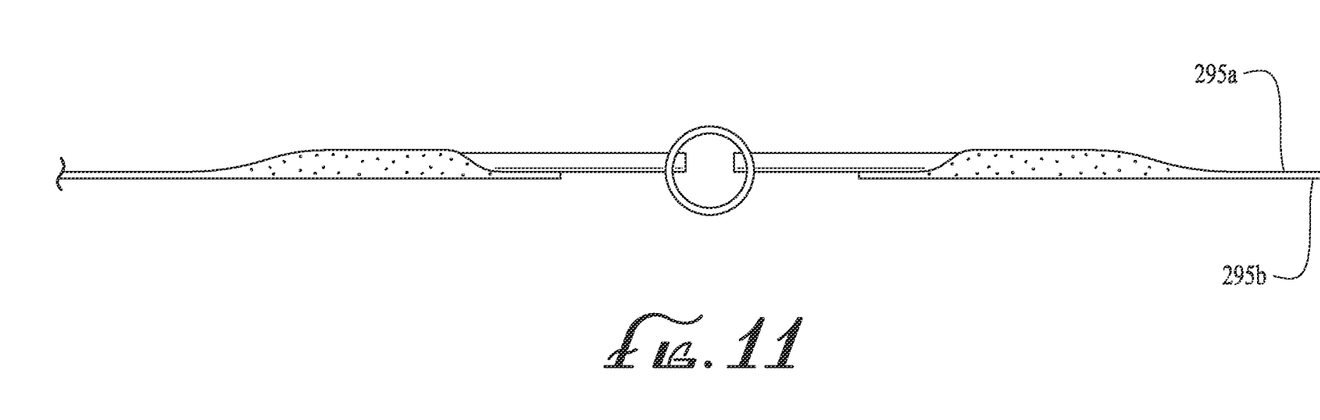
FIG. 11 is a schematic, end view of conduit portions of the collection grid of FIG. 7 in an example form of the present invention.
Figure 12:
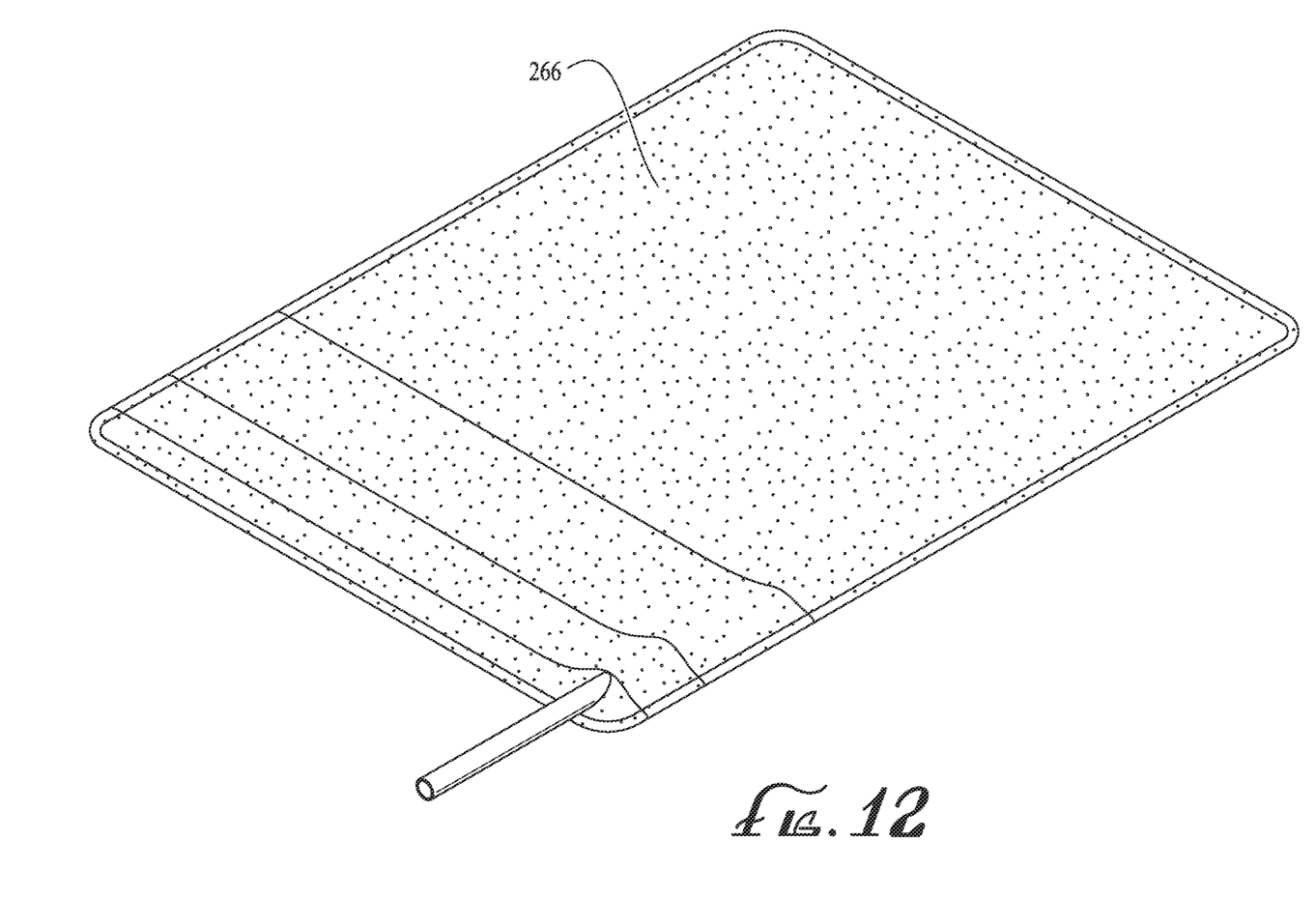
FIG. 12 is a schematic, perspective view of conduit portions of the collection grid of FIG. 7 in an example form of the present invention.
Figure 13:
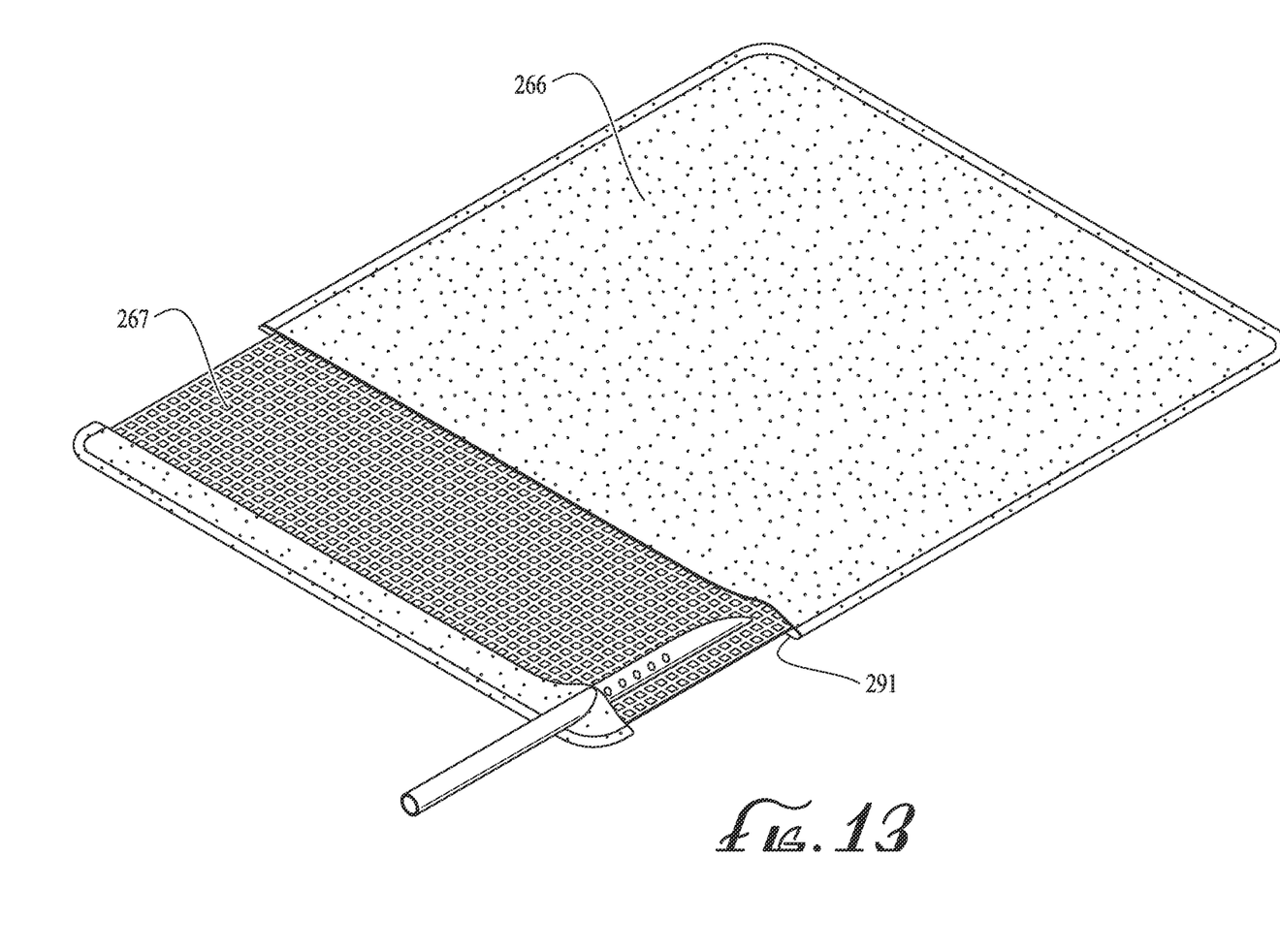
FIG. 13 is a schematic, perspective partially exploded view of conduit portions of the collection grid of FIG. 7.

Optionally, the shallow gas wells 250 each have a perforated gas collector positioned within the perforated inner pipe and connected in fluid communication with the transport conduit. Preferably, the perforated gas collectors are capped at a lower end thereof with a cap and the cap includes a drain to allow condensate to drain out of the perforated gas collector.

Optionally, the gravel-like material in the shallow gas wells 250 comprises gravel. Alternatively, the gravel-like material in the shallow gas wells 250 can be shredded rubber or other material that allows gas to flow through the material.

Optionally, the transport conduits comprise round pipe. Alternatively, the transport conduits can be low-profile, short, flat conduits which are much wider than tall. Further, a combination of round pipe and flat conduits can be employed.

As shown in FIG. 8-13, preferably, the grid 200 is substantially cruciform in shape and at intersections of various conduits an adapter T or cross 280 is provided. Preferably, the grid 200 includes at least one trunk conduit 281 and at least two branch conduits 283. The trunk conduit 281 and the branch conduits 283 each comprise an elongate, non-perforated outer cover. Optionally, the grid further comprises at least four collector conduits 266 which intersect and connect to the branch conduits. The at least four collector conduits 266 each comprise an elongate perforated outer cover or casing 291. In particular examples, the collector conduit may be the transport conduit of the shallow wells 250.

In the case of using a flat, wide conduit, a box-like outer casing 291 forming an enclosure with a substantially flat upper portion 295*a*, a flat lower portion 295*b*, and defining an interior volume 293. The casing can include, or not include, perforations formed therein to provide for the admission of sub-surface gas into the interior volume, as desired. Preferably, the outer casing 291 comprises a fluid-impermeable membrane and the interior volume 293 provides an inner gas or fluid flow channel. Optionally, an upper orifice or inlet opening 297 is formed in the upper portion of the enclosure or casing.

Preferably, the outer casing 291 is thin, and forms a conduit with a large aspect ratio of width to height. Also, the conduit is adapted to be quite long and the interior volume is supported and maintained with the aid of a reinforcement corrugation (J-drain) 267. The corrugation 267 serves to provide structural rigidity and integrity against collapse, in order to maintain an open flow volume, despite forces that may otherwise tend to crush the casing. Preferably, the elongate outer casing 291 is much thinner than it is tall and is flexible. Preferably, the elongate outer casing 291 is made from one or more polymers. Preferably, the elongate outer casing 291 has an aspect ratio of width to height of more than 10:1. More preferably, the elongate outer casing 291 has an aspect ratio of width to height of more than 20:1. In a preferred example, the elongate outer casing has an aspect ratio of width to height of more than 50:1. Optionally, the elongate outer casing 291 has a height of between about 1% inch and about 3 inches. More preferably, the elongate outer cover has a height of about one inch. Optionally, the elongate outer casing 291 can have a width of between about one foot and about 8 feet. So for example, the cover can be a foot wide, two feet wide, 3.5 feet wide, 4 feet wide, 6 feet wide, etc.

The sub-surface gas to be collected and withdrawn with the present invention can be any of several sub-surface gases, such as natural gas. The fluid collected and conveyed can be gaseous or liquid.

In some embodiments, the gas well grid can include a graduated conveyance grid with at least one high-volume, low-profile fluid trunk conduit. It also can include at least two medium-volume, low-profile fluid branch conduits connected to and feeding into the at least one high-volume, low profile trunk conduit. Further, it can include at least four lower-volume, low-profile collector conduits connected to and feeding into the at least two medium-volume, low profile branch conduits, with each branch conduit being connected to at least two of the collector conduits. With this construction, gas can be drawn into the smaller collector conduits, gathered into the somewhat larger branch conduits, and finally into the trunk conduit.

Optionally, the fluid conveyed within the conveyance conduit grid includes at least some water. Optionally, the fluid includes surficial landfill gas. Optionally, the grid is adapted for use under the surface of a landfill, with the grid further comprising an impermeable membrane positioned under the surface of the landfill and over the conduits.

Preferably, the grid is substantially cruciform in shape and at intersections of various conduits an adapter T or cross is provided. Optionally, the adapter T or cross has an upper opening and is provided with a cover for covering the upper opening.

Preferably, the grid includes at least one trunk conduit and the at least two branch conduits each comprise an elongate, non-perforated outer cover. Optionally, the at least four collector conduits each comprise an elongate perforated outer cover.

Preferably, the elongate outer cover comprises a polymer.

Preferably, the collector conduits have an aspect ratio of width to height of more than 10:1. More preferably, the aspect ratio is more than 20:1. Indeed, even an aspect ratio of more than 50:1 can be achieved.

The system design, coupled with a membrane cover, creates a superior barrier and conveyance system for gas emissions. The radius of influence of the system can be every square foot between the waste mass and the atmosphere.

The system requires no drilling (wells), no trenching (buried piping), and no above-ground piping. It also produces no condensate, and allows for a significant reduction in effort in monitoring of collection points.

The system is a designed and manufactured solution that provides for an easy and quick installation of a gas collection system that requires reduced capital costs, lowered O&M costs, stability in gas collection management along with a significant reduction in condensate generation.

Pumps in fluid connection to the system may be used to remove the gas collected by the system. In some embodiments, pressure relief valves may be added to the system in case the pumps fail to remove the gases and fluids collected by the system. The pressure relief valves may be configured to open mechanically based on measured pressure within the system, and allow the gasses and fluids to escape therethrough.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A shallow gas well, such as for use at landfills and the like of the type having a gas-producing waste pile, the shallow gas well comprising:
    a lower geocomposite positioned over the gas-producing waste pile;
    a protective layer of soil positioned over the lower geocomposite;
    an upper geocomposite positioned over the protective layer of soil such that the protective layer of soil is positioned between the lower and upper geocomposites;
    an impermeable geomembrane positioned over the upper geocomposite; and
    a shallow gas well collector positioned within the protective layer of soil and comprising:
        a non-perforated outer pipe extending generally from the lower geocomposite toward the upper geocomposite;
        a perforated inner pipe positioned within and extending within the non-perforated outer pipe and together with the non-perforated outer pipe defining a space between the two pipes;
        a quantity of gravel-like material positioned within the space between the perforated inner pipe and the non-perforated outer pipe; and
        a transport conduit extending beneath the geomembrane and not extending through the membrane for transporting gas produced by the waste pile and collected through the gravel-like material and into and through the perforated inner pipe of the shallow gas well collector.

2. A shallow gas well as claimed in claim 1 further comprising a perforated gas collector positioned within the perforated inner pipe and connected in fluid communication with the transport conduit.

3. A shallow gas well as claimed in claim 2 wherein the perforated gas collector is capped at a lower end thereof with a cap and wherein the cap includes a drain to allow condensate to drain out of the perforated gas collector.

4. A shallow gas well as claimed in claim 1 wherein the gravel-like material comprises gravel.

5. A shallow gas well as claimed in claim 1 wherein the gravel-like material comprises shredded rubber.

6. A shallow gas well as claimed in claim 1 wherein the transport conduit comprises round pipe.

7. A shallow gas well as claimed in claim 1 wherein the transport conduit comprises a low-profile, short, flat conduit which is much wider than it is tall.

8. A collection grid of shallow gas wells for use at landfills and the like of the type having a gas-producing waste pile, the shallow gas wells being connected to one another in fluid communication and each comprising:
    a lower geocomposite positioned over the gas-producing waste pile;
    a protective layer of soil positioned over the lower geocomposite;
    an upper geocomposite positioned over the protective layer of soil such that the protective layer of soil is positioned between the lower and upper geocomposites;
    an impermeable geomembrane positioned over the upper geocomposite; and
    a shallow gas well collector positioned within the protective layer of soil and comprising:
        a non-perforated outer pipe extending generally from the lower geocomposite toward the upper geocomposite;
        a perforated inner pipe positioned within and extending within the non-perforated outer pipe and together with the non-perforated outer pipe defining a space between the two pipes;
        a quantity of gravel-like material positioned within the space between the perforated inner pipe and the non-perforated outer pipe; and
        a transport conduit extending beneath the geomembrane and not extending through the membrane for transporting gas produced by the waste pile and collected through the gravel-like material and into and through the perforated inner pipe of the shallow gas well collector.

9. A collection grid of shallow gas wells as claimed in claim 8 wherein the shallow gas wells each further comprises a perforated gas collector positioned within the perforated inner pipe and connected in fluid communication with the transport conduit.

10. A collection grid of shallow gas wells as claimed in claim 8 wherein the shallow gas wells each is capped at a lower end of the perforated gas collector with a cap and wherein the cap includes a drain to allow condensate to drain out of the perforated gas collector.

11. A collection grid of shallow gas wells as claimed in claim 8 wherein the gravel-like material in the shallow gas wells comprises gravel.

12. A collection grid of shallow gas wells as claimed in claim 8 wherein the gravel-like material in the shallow gas wells comprises shredded rubber.

13. A collection grid of shallow gas wells as claimed in claim 8 wherein the transport conduits comprise round pipe.

14. A collection grid of shallow gas wells as claimed in claim 8 wherein the transport conduits comprise low-profile, short, flat conduits which are much wider than tall.

15. A collection grid of shallow gas wells as claimed in claim 8 wherein the transport conduits comprise mixture of round pipes and low-profile, short, flat conduits which are much wider than they are tall.

* * * * *